United States Patent
Tsai et al.

(10) Patent No.: US 10,666,341 B2
(45) Date of Patent: May 26, 2020

(54) APPARATUSES AND METHODS FOR BEAM SWEEPING IN A WIRELESS COMMUNICATION SYSTEM

(71) Applicant: MEDIATEK INC., Hsin-Chu (TW)

(72) Inventors: Chiou-Wei Tsai, Hsinchu (TW);
Guo-Hao Gau, Hsinchu (TW);
Cheng-Po Liang, Hsinchu (TW);
Xiu-Sheng Li, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/893,885

(22) Filed: Feb. 12, 2018

(65) Prior Publication Data
US 2018/0234156 A1    Aug. 16, 2018

Related U.S. Application Data

(60) Provisional application No. 62/458,048, filed on Feb. 13, 2017.

(51) Int. Cl.
| | |
|---|---|
| *H04B 7/06* | (2006.01) |
| *H04B 7/0408* | (2017.01) |
| *H04B 7/0404* | (2017.01) |
| *H04B 7/08* | (2006.01) |
| *H04B 15/00* | (2006.01) |

(52) U.S. Cl.
CPC ......... *H04B 7/0686* (2013.01); *H04B 7/0404* (2013.01); *H04B 7/0408* (2013.01); *H04B 7/0695* (2013.01); *H04B 7/088* (2013.01); *H04B 15/00* (2013.01)

(58) Field of Classification Search
CPC .. H04B 7/0695; H04B 7/0408; H04B 7/0617; H04B 7/088; H04B 1/1027; H04W 72/046

USPC ........................................................ 375/267
See application file for complete search history.

(56) References Cited

U.S. PATENT DOCUMENTS

| | | | |
|---|---|---|---|
| 2004/0002363 A1 | 1/2004 | Cuffaro | |
| 2011/0038308 A1 | 2/2011 | Song et al. | |
| 2014/0050280 A1* | 2/2014 | Stirling-Gallacher | ...................... H04B 7/0486 375/296 |
| 2015/0009951 A1* | 1/2015 | Josiam | ................ H04L 25/0224 370/330 |
| 2016/0248451 A1* | 8/2016 | Weissman | ............ H04B 1/0064 |
| 2016/0323075 A1* | 11/2016 | Jeong | .................... H04L 5/0023 |

(Continued)

FOREIGN PATENT DOCUMENTS

| | | |
|---|---|---|
| WO | 2016/043502 A1 | 3/2016 |
| WO | 2017/030601 A1 | 2/2017 |

OTHER PUBLICATIONS

"Considerations for DL Broadcast Channel;" 3GPP TSG RAN WG1 Meeting #86bis; Oct. 2016; pp. 1-4.

(Continued)

*Primary Examiner* — Leila Malek
(74) *Attorney, Agent, or Firm* — McClure, Qualey & Rodack, LLP

(57) ABSTRACT

A wireless communication device including a controller and a non-transitory machine-readable storage medium operatively coupled to the controller is provided. The controller executes program code stored in the non-transitory machine-readable storage medium to perform operations including: transmitting or receiving wireless signals by sweeping beams in a non-sequential order.

22 Claims, 7 Drawing Sheets

(56) References Cited

U.S. PATENT DOCUMENTS

2017/0231011 A1* 8/2017 Park .................. H04W 16/14
2017/0257780 A1   9/2017 Ryoo et al.
2018/0199363 A1* 7/2018 Lee ................... H04L 5/0044
2018/0212659 A1* 7/2018 Xiong ................ H04W 72/046

OTHER PUBLICATIONS

"WF on SRS for UL beam management;" 3GPP TSG RAN1 Ad-Hoc meeting; Jan. 2017; pp. 1-3.

* cited by examiner

APPARATUSES AND METHODS FOR BEAM SWEEPING IN A WIRELESS COMMUNICATION SYSTEM

CROSS REFERENCE TO RELATED APPLICATIONS

This Application claims priority of U.S. Provisional Application No. 62/458,048, filed on Feb. 13, 2017, the entirety of which is incorporated by reference herein.

BACKGROUND OF THE APPLICATION

Field of the Application

The application generally relates to wireless communications, and more particularly, to apparatuses and methods for beam sweeping in a wireless communication system (e.g., a fifth-generation (5G) New Radio (NR) system or a Wi-Fi system).

Description of the Related Art

The fifth generation (5G) New Radio (NR) technology is an improvement upon the fourth generation (4G) Long Term Evolution (LTE) technology, which provides extreme data speeds and capacity, by utilizing higher and unlicensed spectrum bands (e.g., above 30 GHz, loosely known as millimeter Wave (mmWave)), for wireless broadband communications. Due to the huge path and penetration losses at millimeter wavelengths, a technique called "beamforming" is employed and it assumes an important role in establishing and maintaining a robust communication link.

Beamforming generally requires one or more antenna arrays, each comprising a plurality of antennas. By appropriately setting antenna weights that define a contribution of each one of the antennas to a transmission or reception operation, it becomes possible to shape the sensitivity of the transmission/reception to a particularly high value in a specific beamformed direction. By applying different antenna weights, different beam patterns can be achieved, e.g., different directive beams can be sequentially employed.

During a transmission (Tx) operation, beamforming may direct the signal towards a receiver of interest. Likewise, during a reception (Rx) operation, beamforming may provide a high sensitivity in receiving the signal originating from a sender of interest. Since the transmission power may be anisotropically focused, e.g., into a solid angle of interest, beamforming may provide better link budgets due to lower required Tx power and higher received signal power, when compared to a conventional practice which does not employ beamforming and relies on more or less isotropic transmission.

However, such technique as mentioned above faces certain challenges. For example, in the initial access stage of wireless communications, multi-beam operations are often conducted to sweep over all beams to select suitable beam pairs for wireless transmission and reception. Typically, beam sweeping is performed by sequentially pointing directive beams in a sequential order to discover a transceiver of interest. Particularly, during the initial access stage in a 5G NR system, there are situations where consecutive Random Access Channel (RACH) occasions are allocated to a next generation Node-B (gNB) to perform beam sweeping for wireless reception. FIG. 1 is a schematic diagram illustrating consecutive RACH occasions allocated to a gNB for Rx beam sweeping in a sequential order. As the 3rd Generation Partnership Project (3GPP) has concluded that the ON-OFF transient period for a UE is 5 micro-seconds for carrier frequencies above 24 GHz. The 5 micro-seconds transient period of a UE may introduce significant interferences to the UEs attempting to access the gNB in the preceding and following RACH occasions, as shown in FIG. 1.

Therefore, it is desirable to have a more robust way of beam sweeping, which may mitigate the interferences at the boundaries of beam switching.

BRIEF SUMMARY OF THE APPLICATION

In order to solve the aforementioned problem, the present application proposes wireless communication devices and beam sweeping methods, in which the beams are configured to be swept in a non-sequential order (e.g., in a beam-interleaving manner), so that inter-Orthogonal frequency-division multiplexing (OFDM)-symbol interferences may be efficiently reduced.

In one aspect of the application, a wireless communication device comprising a controller and a non-transitory machine-readable storage medium operatively coupled to the controller is provided. The controller is configured to execute program code stored in the non-transitory machine-readable storage medium to perform operations comprising: transmitting or receiving wireless signals by sweeping beams in a non-sequential order.

In another aspect of the application, a beam sweeping method, executed by a wireless communication device, is provided. The beam sweeping method comprises the steps of: transmitting or receiving wireless signals by sweeping beams in a non-sequential order.

Other aspects and features of the present application will become apparent to those with ordinarily skill in the art upon review of the following descriptions of specific embodiments of the wireless communication devices and the beam sweeping methods.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
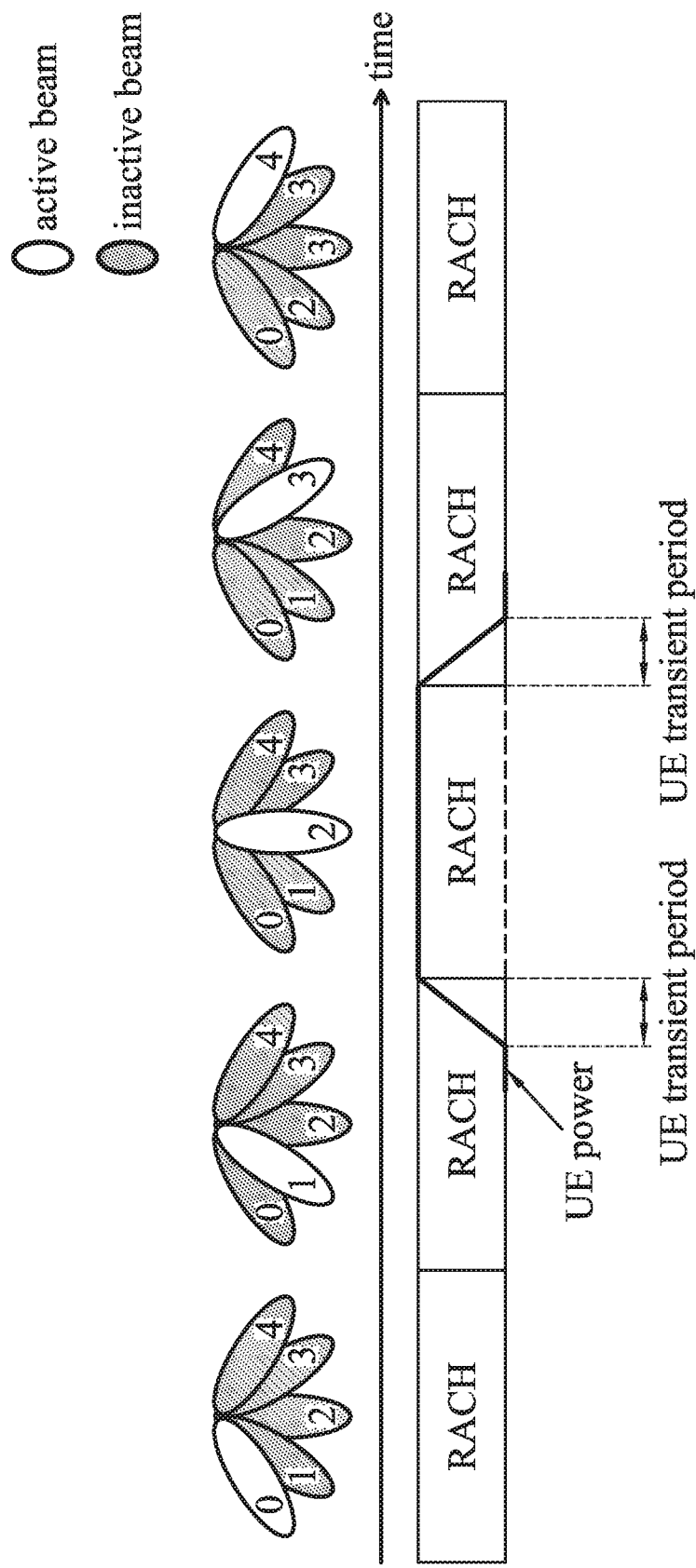
FIG. 1 is a schematic diagram illustrating consecutive RACH occasions allocated to a gNB for Rx beam sweeping in a sequential order.
Figure 2:
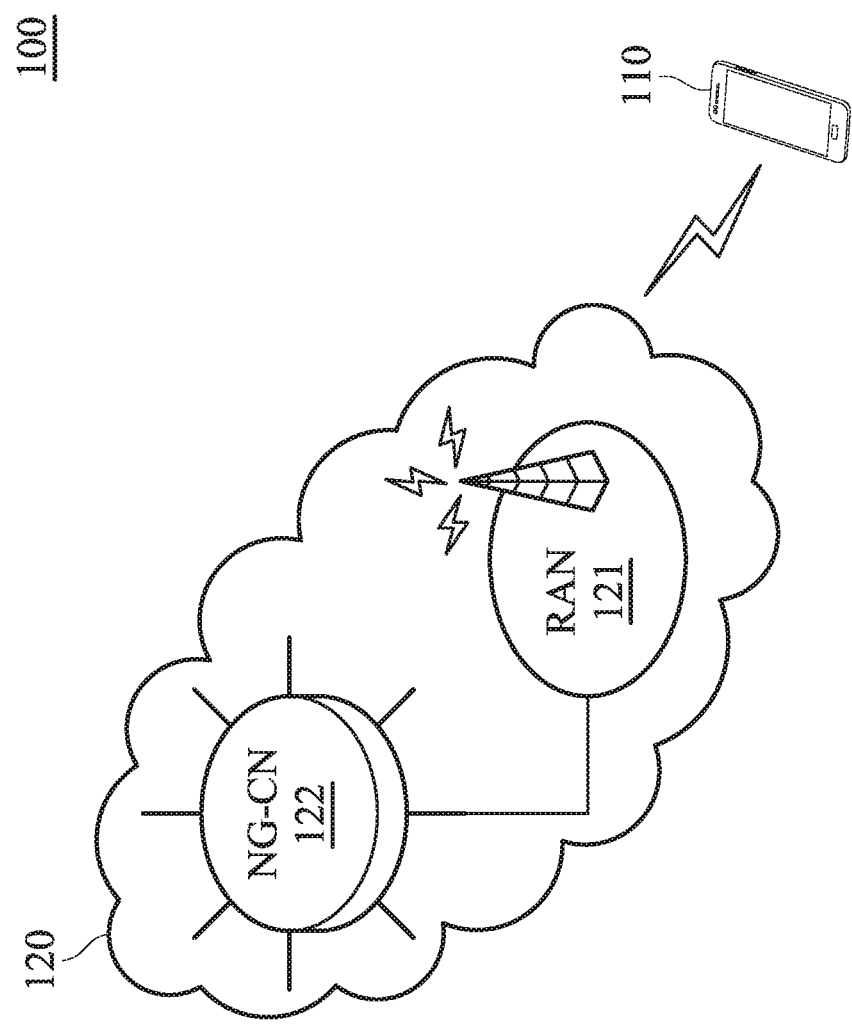
FIG. 2 is a block diagram of a wireless communication environment according to an embodiment of the application.

FIG. 2 is a block diagram of a wireless communication environment according to an embodiment of the application. The wireless communication environment 100 includes a User Equipment (UE) 110 and a 5G NR network 120, wherein the UE 110 is wirelessly connected to the 5G NR network 120 for obtaining mobile services.

The UE 110 may be a feature phone, a smartphone, a panel Personal Computer (PC), a laptop computer, or any wireless communication device supporting the wireless technology (i.e., the 5G NR technology) utilized by the 5G NR network 120 and/or the Wireless-Fidelity (Wi-Fi) technology. Particularly, the wireless communication device employs the beamforming technique for wireless transmission and/or reception.

The 5G NR network 120 includes a Radio Access Network (RAN) 121 and a Next Generation Core Network (NG-CN) 122.

The RAN 121 is responsible for processing radio signals, terminating radio protocols, and connecting the UE 110 with the NG-CN 122. The RAN 121 may include one or more gNBs which support high frequency bands (e.g., above 24 GHz), and each gNB may further include one or more Transmission Reception Points (TRPs), wherein each gNB or TRP may be referred to as a 5G cellular station. Some gNB functionalities may be distributed across different TRPs, while others may be centralized, leaving the flexibility and scope for specific deployments to fulfill the requirements for specific use cases. Specifically, each gNB or TRP may employ the beamforming technique to generate one or more beams, each with a different beamformed direction, for wireless transmission and/or reception.

The NG-CN 122 generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform. e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be noted that the 5G NR network 120 depicted in FIG. 2 is for illustrative purposes only and is not intended to limit the scope of the application. The invention could be applied to other wireless technologies. For example, the UE 110 may be a wireless communication device supporting Wi-Fi technology and may be wirelessly connected to a Wi-Fi network, which also supports the beamforming technique for wireless transmission and/or reception to/from the UE 110.

Figure 3:
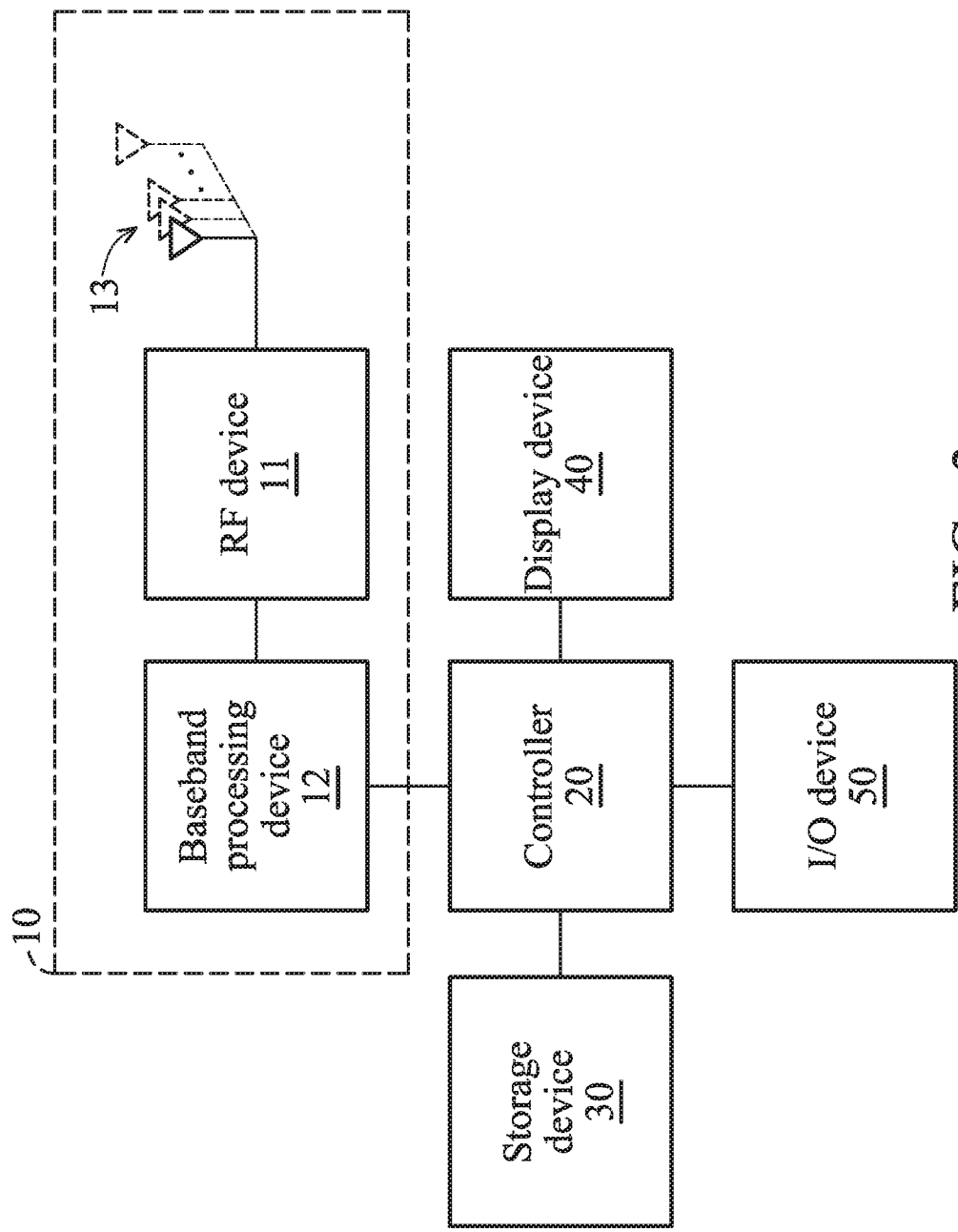
FIG. 3 is a block diagram illustrating the UE 110 according to an embodiment of the application.

FIG. 3 is a block diagram illustrating the UE 110 according to an embodiment of the application. The UE 110 includes a wireless transceiver 10, a controller 20, a storage device 30, a display device 40, and an Input/Output (I/O) device 50.

The wireless transceiver 10 is configured to perform wireless transmission and reception to and from the RAN 121. Specifically, the wireless transceiver 10 includes a Radio Frequency (RF) device 11, a baseband processing device 12, and antenna(s) 13, wherein the antenna(s) 13 may include one or more antennas for beamforming. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may comprise a mixer to multiply the baseband signals with a carrier oscillated in the radio frequency of the supported wireless technologies, wherein the radio frequency may be any radio frequency (e.g., 30 GHz-300 GHz for mmWave) utilized in the 5G NR technology, or another radio frequency, depending on the wireless technology in use.

To further clarify, beamforming is a signal processing technique used in the antenna array 13 or implemented by the baseband processing device 12 or by a combination of the above two for directional signal transmission/reception. In beamforming, a beam is be formed by combining elements in a phased array of antennas in such a way that signals at particular angles experience constructive interference while others experience destructive interference. Different beams are formed simultaneously using multiple arrays of antennas. The number of simultaneous beams in the time/frequency domain depends on the number of antenna array elements and the radio frequency being utilized.

The controller 20 may be a general-purpose processor, a Micro Control Unit (MCU), an application processor, a Digital Signal Processor (DSP), Application Processor (AP), or the like, which includes various circuits for providing the functions of data processing and computing, controlling the wireless transceiver 10 for wireless communications with the RAN 121, storing and retrieving data (e.g., program code) to and from the storage device 30, sending a series of frame data (e.g. representing text messages, graphics, images, etc.) to the display device 40, and receiving signals from the I/O device 50. In particular, the controller 20 coordinates the aforementioned operations of the wireless transceiver 10, the storage device 30, the display device 40, and the I/O device 50 for performing the beam sweeping method of the present application.

In another embodiment, the controller 20 may be incorporated into the baseband processing device 12, to serve as a baseband processor.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the beam sweeping method of the present application.

The display device 40 may be a Liquid-Crystal Display (LCD), Light-Emitting Diode (LED) display, or Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 3 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications.

Figure 4:
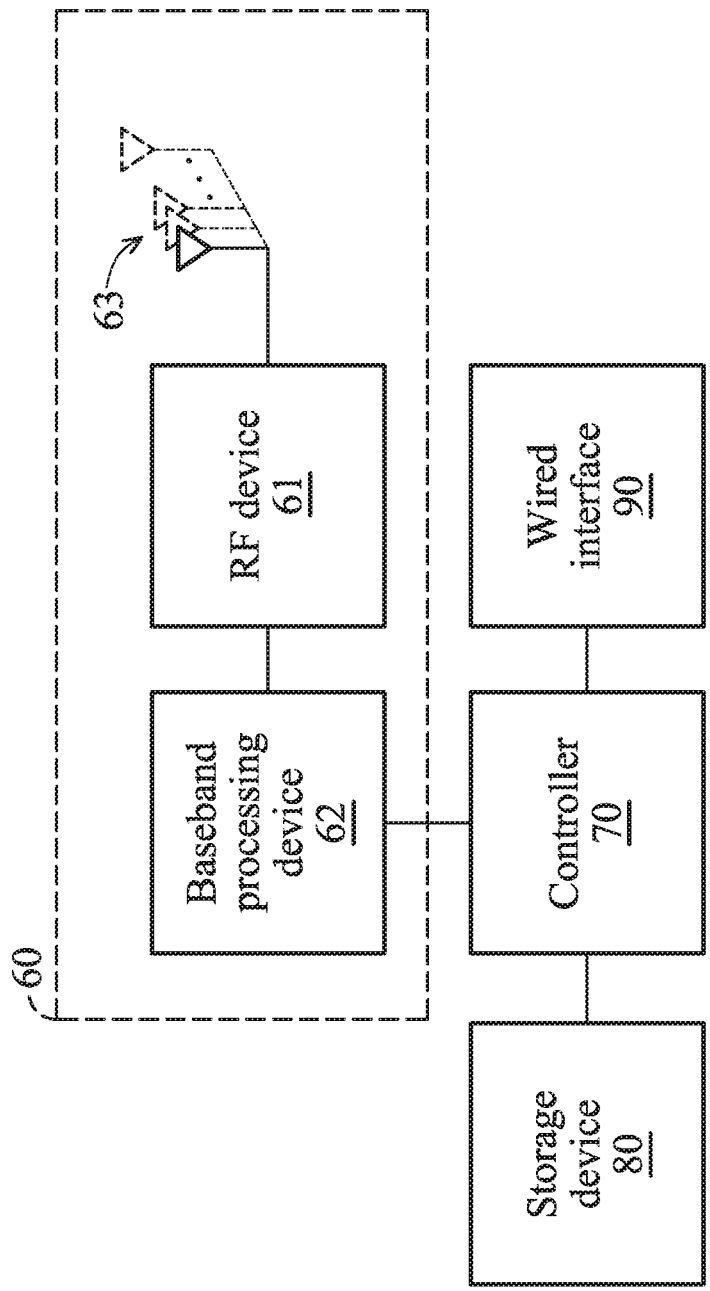
FIG. 4 is a block diagram illustrating a cellular station according to an embodiment of the application.

FIG. 4 is a block diagram illustrating a cellular station according to an embodiment of the application. The cellular station may be a 5G cellular station, such as a gNB or TRP. The cellular station includes a wireless transceiver 60, a controller 70, a storage device 80, and a wired interface 90.

The wireless transceiver 60 is configured to perform wireless transmission and reception to and from the UE 110. Specifically, the wireless transceiver 60 includes an RF device 61, a baseband processing device 62, and antenna(s) 63, wherein the antenna(s) 63 may include one or more antennas for beamforming. The functions of the RF device 61, the baseband processing device 62, and the antenna(s) 63 are similar to those of the RF device 11, the baseband processing device 12, and the antenna(s) 13 as described in the embodiment of FIG. 3, and thus, the detailed description is not repeated herein for brevity.

The controller 70 may be a general-purpose processor, an MCU, an application processor, a DSP an AP, or the like, which includes various circuits for providing the functions of data processing and computing, controlling the wireless transceiver 60 for wireless communications with the UE 110, storing and retrieving data (e.g., program code) to and from the storage device 80, and sending/receiving messages to/from other network entities (e.g., other cellular stations in the RAN 121 or other network entities in the NG-CN 122) through the wired interface 90. In particular, the controller 70 coordinates the aforementioned operations of the wireless transceiver 60, the storage device 80, and the wired interface 90 to perform the beam sweeping method of the present application.

In another embodiment, the controller 70 may be incorporated into the baseband processing device 62, to serve as a baseband processor.

As will be appreciated by persons skilled in the art, the circuits of the controllers 20 and 70 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed. RTL is well known for its role and use in the facilitation of the design process of electronic and digital systems.

The storage device 80 may be a memory, such as a FLASH memory or an NVRAM, or a magnetic storage device, such as a hard disk or a magnetic tape, or an optical disc, or any combination thereof for storing instructions and/or program code of applications, communication protocols, and/or the beam sweeping method of the present application.

The wired interface 90 is responsible for providing wired communications with other network entities, such as other cellular stations in the RAN 121, or other network entities in the NG-CN 122. The wired interface 90 may include a cable modem, an Asymmetric Digital Subscriber Line (ADSL) modem, a Fiber-Optic Modem (FOM), and/or an Ethernet network interface.

It should be understood that the components described in the embodiment of FIG. 4 are for illustrative purposes only and are not intended to limit the scope of the application. For example, the cellular station may further include other functional devices, such as a display device (e.g., LCD. LED display, or EPD, etc.), an I/O device (e.g., button, keyboard, mouse, touch pad, video camera, microphone, speaker, etc.), and/or a power supply, etc.

Figure 5:
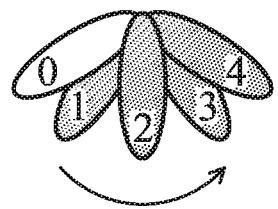
FIG. 5 is a schematic diagram illustrating a directional sequence of beams according to an embodiment of the application.

FIG. 5 is a schematic diagram illustrating a directional sequence of beams according to an embodiment of the application. As shown in FIG. 5, there are 5 beams in the sequence, which are denoted with numbers from 0 to 4 and are generated in sequence at different times. For example, beam 0 is generated in the first time interval, and beam 1 is generated in the second time interval, and so on. Particularly, all of the beams are generated with the same beam width, but the directions of the beams generated later in time are moving counterclockwise. Please note that, conventionally, beam sweeping is performed in the order of a directional sequence (i.e., beam 0 is swept first, and then beam 1, beam 2, beam 3, and beam 4 in sequence).

Figure 6:
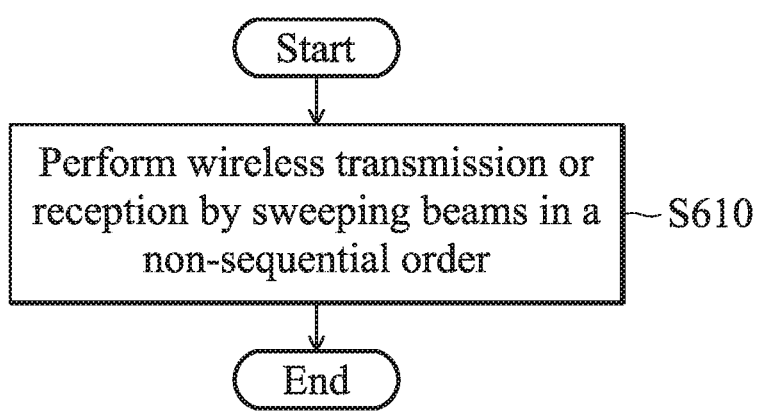
FIG. 6 is a flow chart illustrating the beam sweeping method according to an embodiment of the application.

FIG. 6 is a flow chart illustrating the beam sweeping method according to an embodiment of the application. In this embodiment, the beam sweeping method may be applied to a wireless communication device, such as the UE 110 or a 5G cellular station or a Wi-Fi router, for transmission or reception operation. To begin with, the wireless communication device performs wireless transmission or reception by sweeping beams in a non-sequential order (step S610), and the method ends. Specifically, the beams are generated in different time intervals, e.g., different RACH occasions allocated in the time domain, and the non-sequential order indicates that some or all of the beams are not followed by their neighboring beams. In other words, unlike the conventional practice, the beams are swept in a beam-interleaving manner in the present application, so that inter-OFDM-symbol interference is further mitigated.

During the beam sweeping process, the beams are swept according to the interference at the boundary between a current beam and another beam. In one embodiment, the wireless communication device may determine whether the interference at the boundary between the current beam and a neighboring beam of the current beam is greater than a predetermined threshold, and if so, a non-neighboring beam may be preferably selected as the next beam. Otherwise, either the neighboring beam or a non-neighboring beam may be selected as the next beam. In another embodiment, the wireless communication device may calculate the interference at the boundaries between the current beam and each one of the remaining beams, respectively, and select one of the remaining beams, which has the smallest interference, as the next beam.

In one embodiment, the wireless transmission in step S610 may refer to a UE transmitting multiple Physical Random Access Channel (PRACH) signals in different time intervals (e.g., consecutive time slots) using different beams in the non-sequential order.

In another embodiment, the wireless transmission in step S610 may refer to a UE transmitting multiple Sounding Reference Signals (SRS) in different time intervals (e.g., consecutive time slots) using different beams in the non-sequential order.

In another embodiment, the wireless transmission in step S610 may refer to a 5G cellular station, such as a gNB or TRP transmitting Synchronization Signal Blocks (SSBs) and Physical Broadcast Channel (PBCH) information in different time intervals (e.g., consecutive time slots) using different beams in the non-sequential order.

In another embodiment, the wireless transmission in step S610 may refer to a 5G cellular station, such as a gNB or TRP, transmitting Channel State Information Reference Signals (CSI-RS) in different time intervals (e.g., consecutive time slots) using different beams in the non-sequential order.

In one embodiment, the wireless reception in step S610 may refer to a 5G cellular station, such as a gNB or TRP, receiving multiple PRACH signals in different time intervals (e.g., consecutive time slots) using different beams in the non-sequential order.

In another embodiment, the wireless reception in step S610 may refer to a 5G cellular station, such as a gNB or TRP, receiving multiple Physical Uplink Shared Channel (PUSCH) signals in different time intervals (e.g., consecutive time slots) using different beams in the non-sequential order.

In another embodiment, the wireless reception in step S610 may refer to a 5G cellular station, such as a gNB or TRP, receiving multiple Physical Uplink Control Channel (PUCCH) signals in different time intervals (e.g., consecutive time slots) using different beams in the non-sequential order.

In another embodiment, the wireless reception in step S610 may refer to a 5G cellular station, such as a gNB or TRP, receiving different kinds of signals (e.g., including at least two of a PRACH signal, an SRS, a PUSCH signal, and a PUCCH signal) in different time intervals (e.g., consecutive time slots) using different beams in the non-sequential order. In another embodiment, the wireless reception in step S610 may refer to a wireless communication device transmitting or receiving signals by using different beams in the non-sequential order for each symbol time intervals (e.g., each time the wireless communication device transmits or receives a symbol, the wireless communication device uses different beams, and the beams are switched in the non-sequential order).

Figure 7:
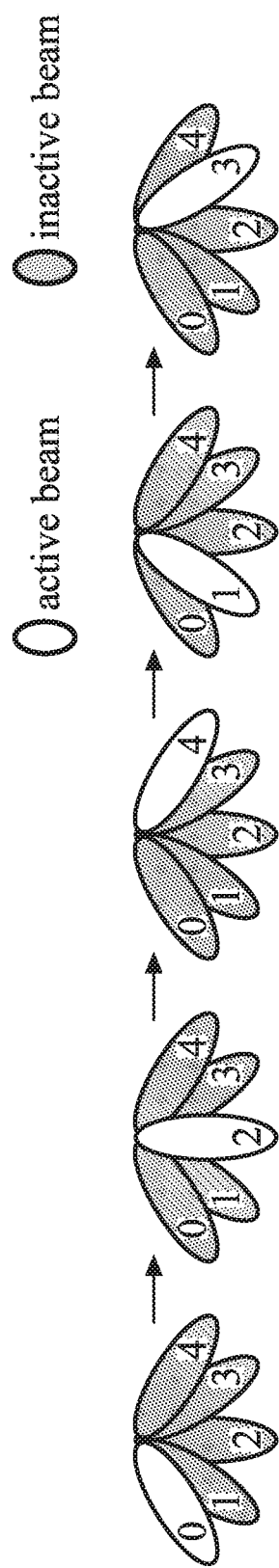
FIG. 7 is a block diagram illustrating beam sweeping in a non-sequential order according to an embodiment of the application.

FIG. 7 is a block diagram illustrating beam sweeping in a non-sequential order according to an embodiment of the application. In this embodiment, a sequence of 5 beams (denoted with numbers from 0 to 4) are generated in different time intervals for wireless transmission or reception.

As shown in FIG. 7, in the first time interval, beam 0 is generated and swept. In the second time interval, beam 2 is generated and swept. In the third time interval, beam 4 is generated and swept. In the fourth time interval, beam 1 is generated and swept. Finally, in the fifth time interval, beam 3 is generated and swept.

Please note that, despite the directional sequence of the beams, beam sweeping is performed in a non-sequential order, i.e., in a beam-interleaving manner. Through the particular arrangement of the non-sequential order as shown in FIG. 7, all of the beams are not followed by their neighboring beams.

Figure 8:
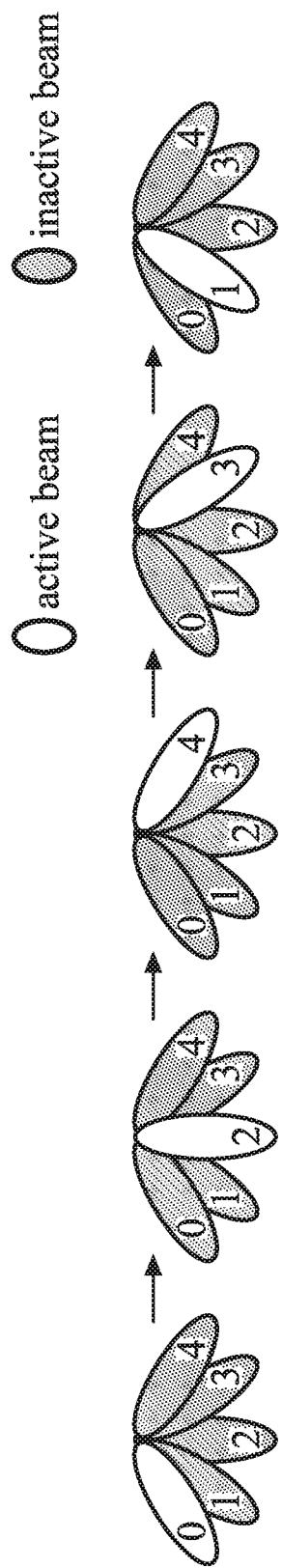
FIG. 8 is a block diagram illustrating beam sweeping in a non-sequential order according to another embodiment of the application.

FIG. 8 is a block diagram illustrating beam sweeping in a non-sequential order according to another embodiment of the application. In this embodiment, a sequence of 5 beams (denoted with numbers from 0 to 4) are generated in different time intervals for wireless transmission or reception.

As shown in FIG. 8, in the first time interval, beam 0 is generated and swept. In the second time interval, beam 2 is generated and swept. In the third time interval, beam 4 is generated and swept. In the fourth time interval, beam 3 (i.e., a neighboring beam of the preceding beam) is generated and swept. Finally, in the fifth time interval, beam 1 is generated and swept.

Please note that, despite the directional sequence of the beams, beam sweeping is performed in a non-sequential order, i.e., in a beam-interleaving manner. Through the particular arrangement of the non-sequential order as shown in FIG. 8, some of the beams are not followed by their neighboring beams.

Figure 9:
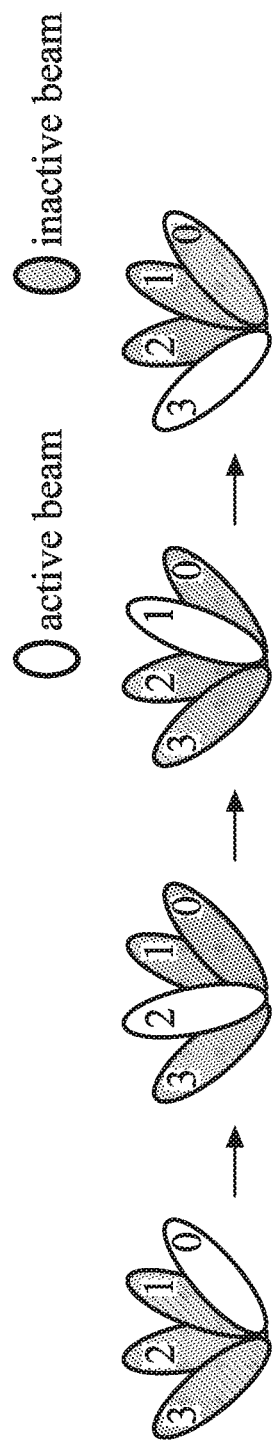
FIG. 9 is a block diagram illustrating beam sweeping in a non-sequential order according to another embodiment of the application.

FIG. 9 is a block diagram illustrating beam sweeping in a non-sequential order according to another embodiment of the application. In this embodiment, a sequence of 4 beams (denoted with numbers from 0 to 3) are generated in different time intervals for wireless transmission or reception.

As shown in FIG. 9, in the first time interval, beam 0 is generated and swept. In the second time interval, beam 2 is generated and swept. In the third time interval, beam 1 (i.e., a neighboring beam of the preceding beam) is generated and swept. Finally, in the fourth time interval, beam 3 is generated and swept.

Please note that, despite the directional sequence of the beams, beam sweeping is performed in a non-sequential order, i.e., in a beam-interleaving manner. Through the particular arrangement of the non-sequential order as shown in FIG. 9, some of the beams are not followed by their neighboring beams.

In view of the forgoing embodiments, it will be appreciated that the present application advantageously mitigates the interferences at the boundaries of beam switching, by configuring the beams to be swept in a non-sequential order. Specifically, the non-sequential order indicates that some or all of the beams are not followed by their neighboring beams. Although examples of the non-sequential order are provided in FIGS. 7 to 9, it should be understood that the examples are for illustrative purposes only and are not intended to limit the scope of the application. For example, the beam sweeping may be performed according the directional sequence as shown in FIG. 5. That is, the beam sweeping may be performed by switching between the different embodiments depicted in FIGS. 5 and 7 to 9.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A wireless communication device, comprising:
    a controller; and
    a non-transitory machine-readable storage medium, operatively coupled to the controller;
    wherein the controller is configured to execute program code stored in the non-transitory machine-readable storage medium to perform operations comprising:
        transmitting or receiving wireless signals by sweeping beams in a non-sequential order, wherein the sweeping of the beams is performed according to interference between beams from the wireless communication device relative to a predetermined threshold at a boundary between a current beam and another beam, wherein a non-neighboring beam of the current beam is selected as a next beam if the interference is greater than the predetermined threshold.

2. The wireless communication device of claim 1, wherein the non-sequential order indicates that some or all of the beams are not followed by their neighboring beams.

3. The wireless communication device of claim 1, wherein the wireless signals are transmitted or received by sweeping the beams in the non-sequential order to mitigate inter-Orthogonal frequency-division multiplexing (OFDM)-symbol interferences.

4. The wireless communication device of claim 1, wherein the transmitted wireless signals comprise multiple Physical Random Access Channel (PRACH) signals in different time intervals, when the wireless communication device is configured as a fifth-generation (5G) User Equipment (UE).

5. The wireless communication device of claim 1, wherein the transmitted wireless signals comprise multiple Sounding Reference Signals (SRS) in different time intervals, when the wireless communication device is configured as a 5G UE.

6. The wireless communication device of claim 1, wherein the transmitted wireless signals comprise Synchronization Signal Blocks (SSBs) and Physical Broadcast Channel (PBCH) information in different time intervals, when the wireless communication device is configured as a 5G cellular station.

7. The wireless communication device of claim 1, wherein the transmitted wireless signals comprise multiple Channel State Information Reference Signals (CSI-RS) in different time intervals, when the wireless communication device is configured as a 5G cellular station.

8. The wireless communication device of claim 1, wherein the received wireless signals comprise multiple PRACH signals in different time intervals, when the wireless communication device is configured as a 5G cellular station.

9. The wireless communication device of claim 1, wherein the received wireless signals comprise multiple Physical Uplink Shared Channel (PUSCH) signals in different time intervals, when the wireless communication device is configured as a 5G cellular station.

10. The wireless communication device of claim 1, wherein the received wireless signals comprise multiple Physical Uplink Control Channel (PUCCH) signals in different time intervals, when the wireless communication device is configured as a 5G cellular station.

11. The wireless communication device of claim 1, wherein the received wireless signals comprise at least two of a PRACH signal, an SRS, a PUCCH signal, and a PUSCH signal in different time intervals, when the wireless communication device is configured as a 5G cellular station.

12. A beam sweeping method, executed by a wireless communication device, comprising:
    transmitting or receiving wireless signals by sweeping the beams in a non-sequential order, wherein the sweeping of the beams is performed according to interference between beams from the wireless communication device relative to a predetermined threshold at a boundary between a current beam and another beam,
    wherein sweeping the beams in the non-sequential order comprises selecting a non-neighboring beam of the current beam as a next beam if the interference is greater than the predetermined threshold.

13. The beam sweeping method of claim 12, wherein the non-sequential order indicates that some or all of the beams are not followed by their neighboring beams.

14. The beam sweeping method of claim 12, wherein the wireless signals are transmitted or received by sweeping the beams in the non-sequential order to mitigate inter-OFDM-symbol interferences.

15. The beam sweeping method of claim 12, wherein the transmitted wireless signals comprise multiple PRACH signals in different time intervals, when the wireless communication device is configured as a 5G UE.

16. The beam sweeping method of claim 12, wherein the transmitted wireless signals comprise multiple SRS in different time intervals, when the wireless communication device is configured as a 5G UE.

17. The beam sweeping method of claim 12, wherein the transmitted wireless signals comprise SSBs and PBCH information in different time intervals, when the wireless communication device is configured as a 5G cellular station.

18. The beam sweeping method of claim 12, wherein the transmitted wireless signals comprise multiple CSI-RS in different time intervals, when the wireless communication device is configured as a 5G cellular station.

19. The beam sweeping method of claim 12, wherein the received wireless signals comprise multiple PRACH signals in different time intervals, when the wireless communication device is configured as a 5G cellular station.

20. The beam sweeping method of claim 12, wherein the received wireless signals comprise multiple PUSCH signals in different time intervals, when the wireless communication device is configured as a 5G cellular station.

21. The beam sweeping method of claim 12, wherein the received wireless signals comprise multiple PUCCH signals in different time intervals, when the wireless communication device is configured as a 5G cellular station.

22. The beam sweeping method of claim 12, wherein the received wireless signals comprise at least two of a PRACH signal, an SRS, a PUCCH signal, and a PUSCH signal in different time intervals, when the wireless communication device is configured as a 5G cellular station.

\* \* \* \* \*